(12) United States Patent
Goerg

(10) Patent No.: US 8,118,515 B2
(45) Date of Patent: Feb. 21, 2012

(54) COUPLING ROD FOR VEHICLE SUSPENSION SYSTEM

(75) Inventor: Alexander Goerg, Geisenheim (DE)

(73) Assignee: MVS Europe GmbH, Liederbach, DE (US)

( * ) Notice: Subject to any disclaimer, the term of this patent is extended or adjusted under 35 U.S.C. 154(b) by 308 days.

(21) Appl. No.: 11/684,886

(22) Filed: Mar. 12, 2007

(65) Prior Publication Data
US 2008/0187395 A1  Aug. 7, 2008

(30) Foreign Application Priority Data
Feb. 5, 2007  (DE) .................. 10 2007 005 567

(51) Int. Cl.
*F16B 2/22* (2006.01)
(52) U.S. Cl. .... 403/372; 403/195; 403/167; 280/93.512
(58) Field of Classification Search .......... 403/195, 403/196, 197, 243, 368, 369, 370, 167, 168, 403/367, 365, 372, 408.1; 16/2.1; 267/140.11, 267/140.13, 141.3, 293, 294; 411/544; 280/93.512
See application file for complete search history.

(56) References Cited

U.S. PATENT DOCUMENTS

| | | | |
|---|---|---|---|
| 1,952,115 A | 3/1934 | Borst, Jr. | |
| 3,304,043 A * | 2/1967 | Beck | 267/140.5 |
| 3,315,952 A * | 4/1967 | Vittone | 267/189 |
| 3,411,803 A * | 11/1968 | Melton et al. | 280/93.508 |
| 4,385,025 A | 5/1983 | Salerno et al. | |
| 4,858,880 A * | 8/1989 | Durand | 267/140.3 |
| 4,883,287 A * | 11/1989 | Murakami et al. | 280/124.135 |
| 5,295,652 A | 3/1994 | Byrne | |
| 5,799,930 A | 9/1998 | Willett | |
| 5,807,010 A | 9/1998 | Parker et al. | |
| 6,588,820 B2 * | 7/2003 | Rice | 296/35.1 |
| 6,666,438 B2 * | 12/2003 | Nakagawa | 267/141.3 |
| 2002/0171220 A1 | 11/2002 | Pazdirek | |
| 2003/0209870 A1 | 11/2003 | Carlstedt et al. | |
| 2005/0279910 A1 | 12/2005 | Huprikar et al. | |
| 2006/0043654 A1 | 3/2006 | Allaei | |
| 2006/0202400 A1 * | 9/2006 | Fitzgerald | 267/140.13 |
| 2006/0226622 A1 | 10/2006 | Trotter | |
| 2006/0255516 A1 | 11/2006 | Dickson et al. | |
| 2008/0136076 A1 * | 6/2008 | Cummings et al. | 267/293 |

FOREIGN PATENT DOCUMENTS

| | | |
|---|---|---|
| FR | 74 28078 | 8/1974 |
| FR | 2 240 838 | 3/1975 |
| GB | 2 032 574 | 5/1980 |
| JP | 55 106810 | 8/1980 |
| JP | 3 279082 | 12/1991 |
| WO | 98/34045 | 8/1998 |

* cited by examiner

*Primary Examiner* — Michael P Ferguson
(74) *Attorney, Agent, or Firm* — Brinks Hofer Gilson & Lione

(57) ABSTRACT

The fastening element connects two parts in a chassis of a vehicle. The fastening element has a central axle on which two opposing paired support elements of damping material are arranged at an axial distance from one another. In order to achieve an improved performance at least one of the support elements is composed of two different components and/or of different material.

7 Claims, 3 Drawing Sheets

COUPLING ROD FOR VEHICLE SUSPENSION SYSTEM

CROSS REFERENCE TO RELATED APPLICATIONS

This Application claims the priority of DE 2007 005 567.8 which was filed on Feb. 5, 2007.

BACKGROUND OF THE INVENTION

The invention relates to a fastening element, in particular for connecting two parts in a chassis, which fastening element has a central axle on which at least two support elements of damping material are arranged at an axial distance from one another.

Fastening elements of this type are required in order, for example in vehicle wheel suspension systems, to secure two parts, which execute certain movements in operation, relative to each other. Fastening elements of this type are also referred to as coupling rods. They ensure that the parts which are to be secured relative to one another are held in a manner low in vibrations. An example of a coupling rod is shown in U.S. Pat No. 4,944,523. As shown therein, the coupling rod is provided with a central axle in the form of a steel bolt 112. See U.S. Pat. No. 4,944,523, Col. 5, 11. 8-16. The coupling rod of U.S. Pat. No. 4,944,523 is also provided with support elements molded of an elastomeric material, referred to as "grommets." U.S. Pat. No. 4,944,523, Col. 5, 11. 35-45.

Consequently, in previously known solutions, a central metal axle is provided onto which support elements of rotationally symmetrical design are pushed. In this case, the support elements are shaped in such a manner that two support elements can secure between them a part which is to be retained. The support elements here are composed of a suitable plastics material such that adequate damping behaviour can be obtained. The use of polyurethane has proven successful here.

In this case, limits which are defined by the forces to be absorbed are to be taken into consideration both in the selection of material for the support elements and in the formation thereof.

It has emerged that coupling rods of the type mentioned at the beginning still leave something to be desired in this regard. In particular, it has been found to be negative that undesirable effects in the form of bending moments occur if the fastening element has to be dimensioned in such a manner that it can absorb high retaining forces.

SUMMARY OF THE INVENTION

The invention is therefore based on the object of developing a fastening element of the type mentioned at the beginning in such a manner that it is capable of absorbing high forces and nevertheless the introduction of undesirable forces and moments is kept small. A further endeavour is for the support element to be able to be easily produced and fitted, thus resulting in a cost-effective realization. The performance of the vehicle equipped with the chassis in which the fastening element is installed is therefore to be improved.

The achievement of this object by the invention is characterized in that at least one of the support elements of the fastening element is composed of at least two different components and/or of different materials.

Accordingly, the support element is therefore composed either of two components which interact; these components may be composed, but do not have to be composed, of different materials. It is just as possible that, although the component is of single-part design, it is constructed from different materials; the last-mentioned possibility is of interest in particular in conjunction with multicomponent injection-moulding.

In this case, the two different components are preferably arranged concentrically about the axle and axially adjacent to each other. The one component may be composed of an elastic, damping material which has a greater hardness than the other component. In this case, a plastic is preferably provided. Particularly preferably, the plastic may be polyurethane. In order to increase the strength of this component, it can be provided that it is provided with reinforcing fibres, with glass fibres or carbon fibres being particularly in mind. The other component is preferably likewise composed of an elastic, damping material. In this case, an elastomeric material, in particular a material based on rubber or based on silicone, is preferably provided.

According to a particularly preferred embodiment, the two components are produced by a two-component injection-moulding process. Alternatively, the two components may be, of course, assembled to form the support elements only by an installation process.

One of the components, namely the one composed of softer material, can have an annular form with a rectangular shape in radial section. Alternatively, an annular form with a wedge-shaped, circular or elliptical contour in radial section may also be provided. In the case of the wedge-shaped structure, the axial extent of the component can increase with increasing distance from the axle.

Furthermore, a continuation of the invention provides that one of the components has a centring surface, in particular one with a cylindrical shape, for the other component. The centring surface may be configured in such a manner that it forms a bearing surface for the radially inner edge of one of the components. It is also possible that, in order to centre the one component, use is made of a separate component which has the centring surface.

At least one support element can be enclosed at its radially outer edge by a component which is sleeve-shaped at least in some sections. The effect achieved by this configuration is that the radially outwardly directed displacement in particular of soft material of one of the components is limited. In this case, the component which is sleeve-shaped at least in some sections is generally composed of metal or of plastic. In the event of the sleeve-shaped component being formed from plastic, polyamide is preferably provided. The said component can be reinforced with reinforcing fibres, in particular with glass fibres or carbon fibres. Furthermore, the component which is sleeve-shaped at least in some sections can have an axial bearing surface for one of the components.

The component which is sleeve-shaped at least in some sections can furthermore have an undercut for the interlocking securing of at least one of the components. The effect achieved by this configuration is that a preassembled unit can be provided, which can be handled in a manner secure against being lost. It can also be provided for there to be a press fit between the sleeve-shaped component and at least one of the components in the fitted state in order to create a fixed composite.

At least two support elements which are axially adjacent to one another can be provided with corresponding guide surfaces which guide the two support elements during a relative axial displacement with respect to each other. These guide surfaces additionally also serve for better guidance of the support elements into the through hole of the two parts, which are to be clamped, in the chassis, as a result of which the installation of the fastening element in accordance with the function thereof is made more secure. In this case, the guide surfaces can interact in the manner of a male-female configuration and can thus ensure good guidance of the two components when they are moved axially towards each other. The guide surfaces preferably have a conical shape in radial section. Finally, the guide surfaces can be arranged on axial projections of the support elements.

Two of the support elements can be held at a defined distance by a further, partially sleeve-shaped component.

The effect which can be achieved by the configuration of the support elements as at least a two-part component with the use of materials of differing hardness is that—particularly in interaction with the further measures mentioned—undesirable forces and moments, in particular bending moments, are reduced, with it nevertheless being possible for relatively large forces to be easily absorbed.

It is possible to provide a preassembled unit which is secure against being lost, and therefore it is significantly less difficult to handle in comparison to previously known solutions. It is therefore made possible, in particular, to positively influence the logistics of the coupling rod and its assembly parts, in particular the support elements, since complete units can be prepared and delivered to the installation site.

BRIEF DESCRIPTION OF THE DRAWINGS

The drawing illustrates an exemplary embodiment of the invention. In the drawing.

DETAILED DESCRIPTION OF THE INVENTION

Figure 1:
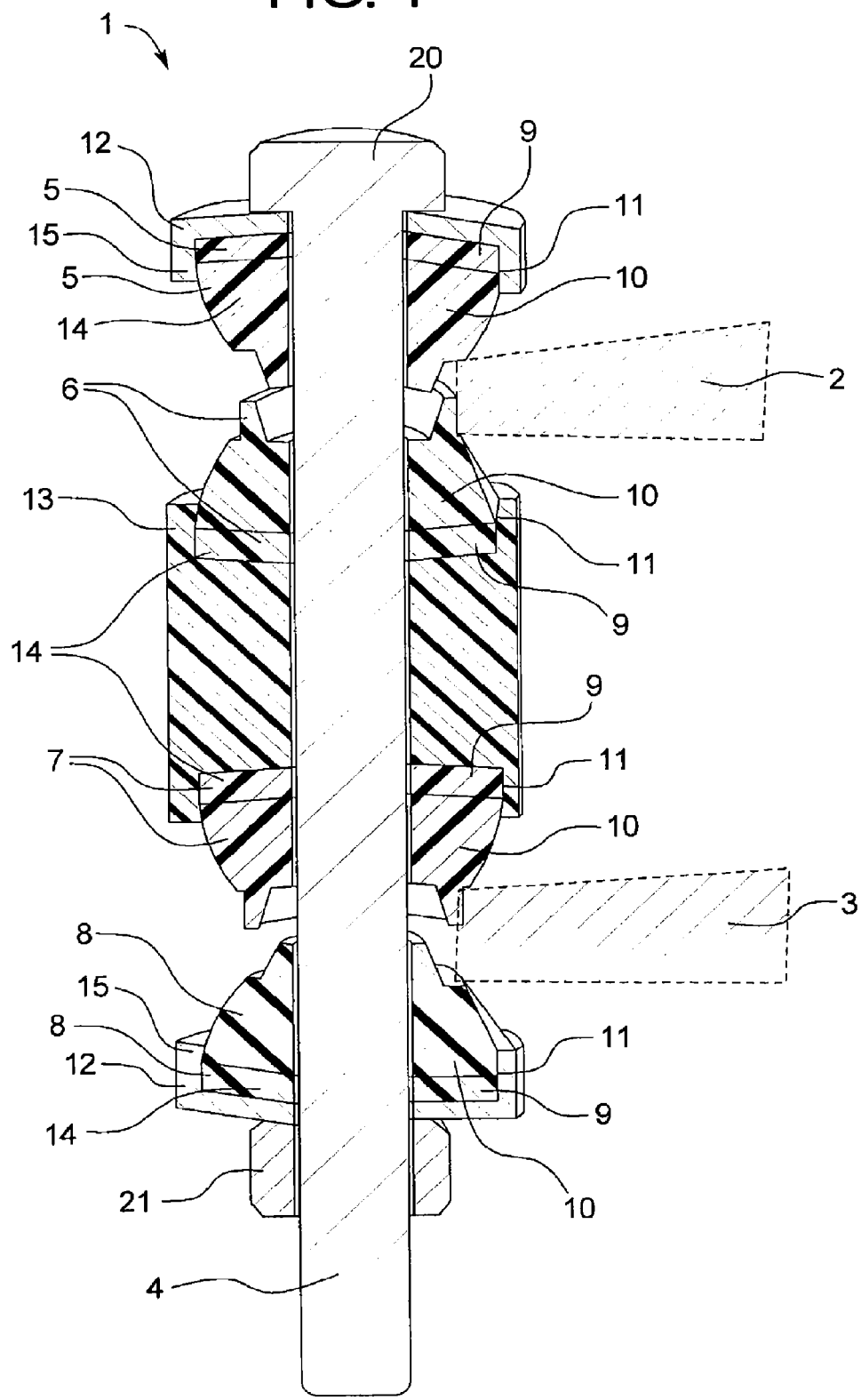
FIG. 1 shows, schematically, a fastening element for holding two parts of a vehicle suspension system, in a cut away, perspective view.

A fastening element 1 which is referred to as a coupling element can be seen in the figures; it is sold under the trademark Pogostik, registered with the United States Patent and Trademark Office on Feb. 11, 2003, Registration No. 2,686,834. The fastening element serves to secure two parts 2 and 3 (see FIG. 1) of a chassis relative to each other, which has to take place in a vibration-damping and secure manner. The parts 2 and 3 are only indicated schematically in FIG. 1.

To this end, the fastening element 1 has a central axle 4 of steel, on which a plurality of support elements 5, 6, 7, 8 are arranged. Each support element 5, 6, 7, 8 is of rotationally symmetrical design. In radial section, the support elements 5, 6, 7, 8 have a shape tapering to a point on one side. A simple cylindrical shape is also possible. Every two support elements, namely the support elements 5 and 6 and the support elements 7 and 8, are arranged on the axle 4, in such a manner that they are directed towards each other with their regions tapering to a point. Accordingly, the support elements 5 and 6 and 7 and 8 form receiving regions for the parts 2 and 3, respectively, between them.

The axle 4 has a head 20 in the upper region. A thread with a nut can also be provided there. In the lower region—which is not illustrated specifically—a thread is provided onto which a nut 21 is screwed. A fixed composite, to which the two parts 2 and 3 can be fixedly mounted, is therefore produced in the fitted state of the fastening element 1.

It is preferred that the support elements 5, 6, 7, 8 in the exemplary embodiment are each composed of two different components 9 and 10, with the components 9, 10 being composed of different materials.

The component 9 is manufactured from a material which is softer than that of the component 10. The material of the component 9 is preferably an elastomeric material which can be based on rubber or based on silicone.

By contrast, the component 10 is relatively hard. In the exemplary embodiment, it is composed of polyurethane, the degree of hardness of which is selected specifically for the application. Other thermoplastics are certainly also possible. The support elements 5, 6, 7, 8 and therefore the components 9 and 10 are partially accommodated in sleeve-shaped components 12 and 13, respectively. In the exemplary embodiment, the sleeve-shaped component 12 is composed of metal. Manufacturing it from a fibre-reinforced plastic, preferably of polyamide with reinforcing fibres of glass or carbon, is also possible. In the exemplary embodiment, the sleeve-shaped component 13 is composed of a fibre-reinforced plastic, preferably of polyamide with reinforcing fibres of glass or carbon. Manufacturing it from metal is also possible.

The upper and the lower sleeve-shaped components 12 have an L-shaped and therefore cup-like contour in radial section and therefore form axial bearing surfaces 14 for the softer component 9. The harder component 10 is accordingly adjacent to the component 9, with the two components 9, 10 bearing against each other in a sheetlike manner via an annular surface.

The central sleeve-shaped component 13 has axial bearing surfaces 14 for two components which are also spaced apart axially from each other by the component 13 (and, as a result, component 13 shall also be referred to as a spacer 13).

Since, caused by the construction, the sleeve-shaped sections of the components 12 and 13 engage in the axial and radial direction around the—soft and correspondingly easily deformable—components 9, they constitute an edge enclosure for the edge 11 of the components 9 and 10 to this extent or within the scope of their axial extent.

When an axial force is applied to the fastening element 1, the sleeve-shaped components 12 and 13 therefore prevent the relatively soft material of the component 9 from being displaced or squeezed radially. This achieves a high degree of damping comfort and low undesirable forces and moments, in particular bending moments, and, nevertheless, a high degree of axial rigidity of the fastening element 1 is maintained without losses of function occurring.

Figure 2:
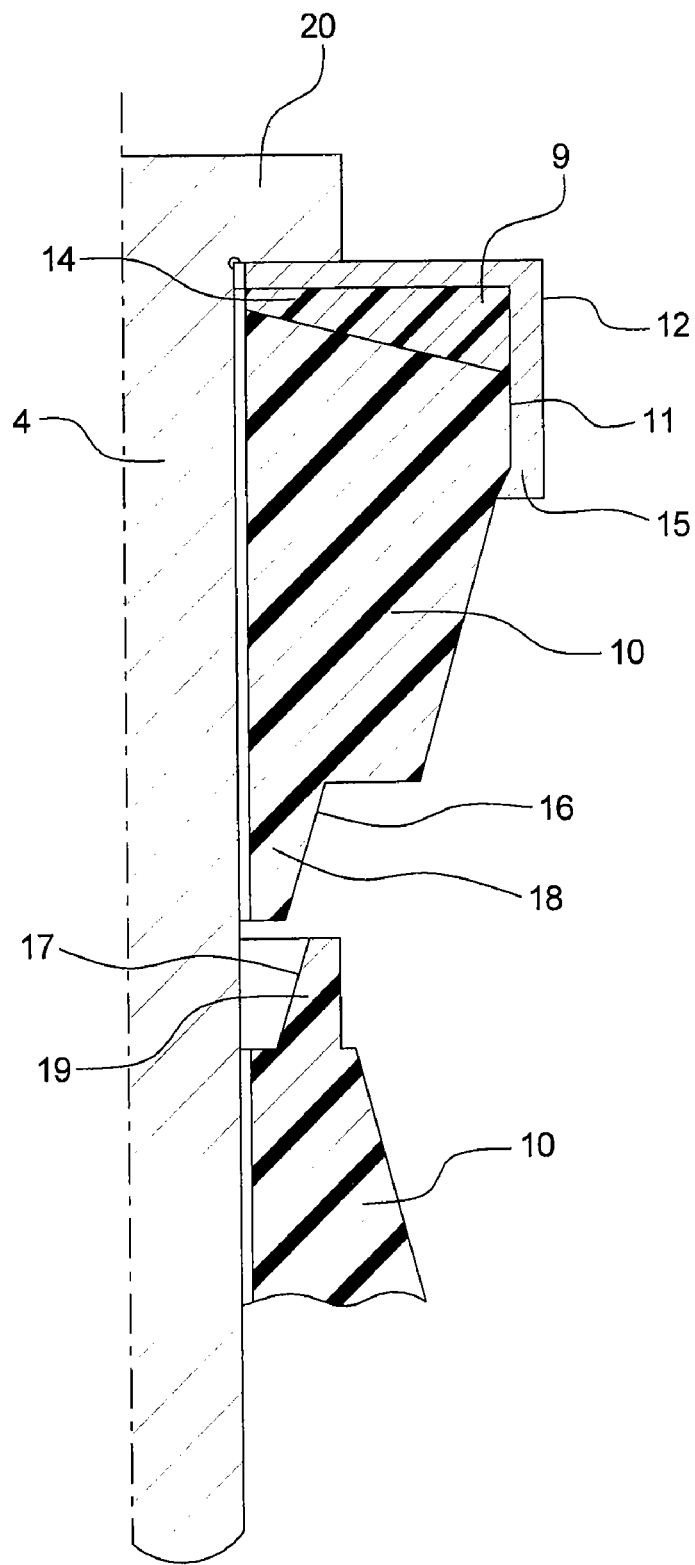
FIG. 2 shows the right upper end region of the fastening element in an enlarged view and in radial section, with a variant embodiment of somewhat alternative design to FIG. 1 being illustrated.

A number of details of the proposed solution emerge from the exemplary embodiment according to FIG. 2. Here, the components 9 of soft material are not—as in FIG. 1—of rectangular design in radial section; on the contrary, they have a wedge shape. The axial extent of the components 9 is greater with increasing distance from the axle.

The sleeve-shaped components 12, 13 here have an undercut 15 (only illustrated for the component 12) which can be produced by a forming operation. This undercut 15 creates the possibility of preassembling a unit which is secure against being lost, which substantially simplifies the logistics. Similarly, the desired function of the undercut—namely the preassembly of the individual components which are secure against being lost—can be achieved by a simple interference fit between the components 10 and 12 and 10 and 13.

So that the two support elements 5 and 6, and 7 and 8 are guided neatly relative to each other when they meet each other axially, axial projections 18 and 19 which are respectively provided with guide surfaces 16 and 17 are arranged on the components 10. The guide surfaces 16, 17 correspond to each other, i.e. in the present case they have conical surfaces with the same angle of taper. If the support elements 5, 6, 7, 8 meet one another, they are therefore securely guided by the conical surfaces. Similarly, these guide surfaces additionally also serve for better introduction of the support elements into the through hole of the parts 2 and 3, which are to be clamped, in the chassis, as a result of which the installation of the fastening element 1 in accordance with the function thereof is made more secure.

Figure 3:
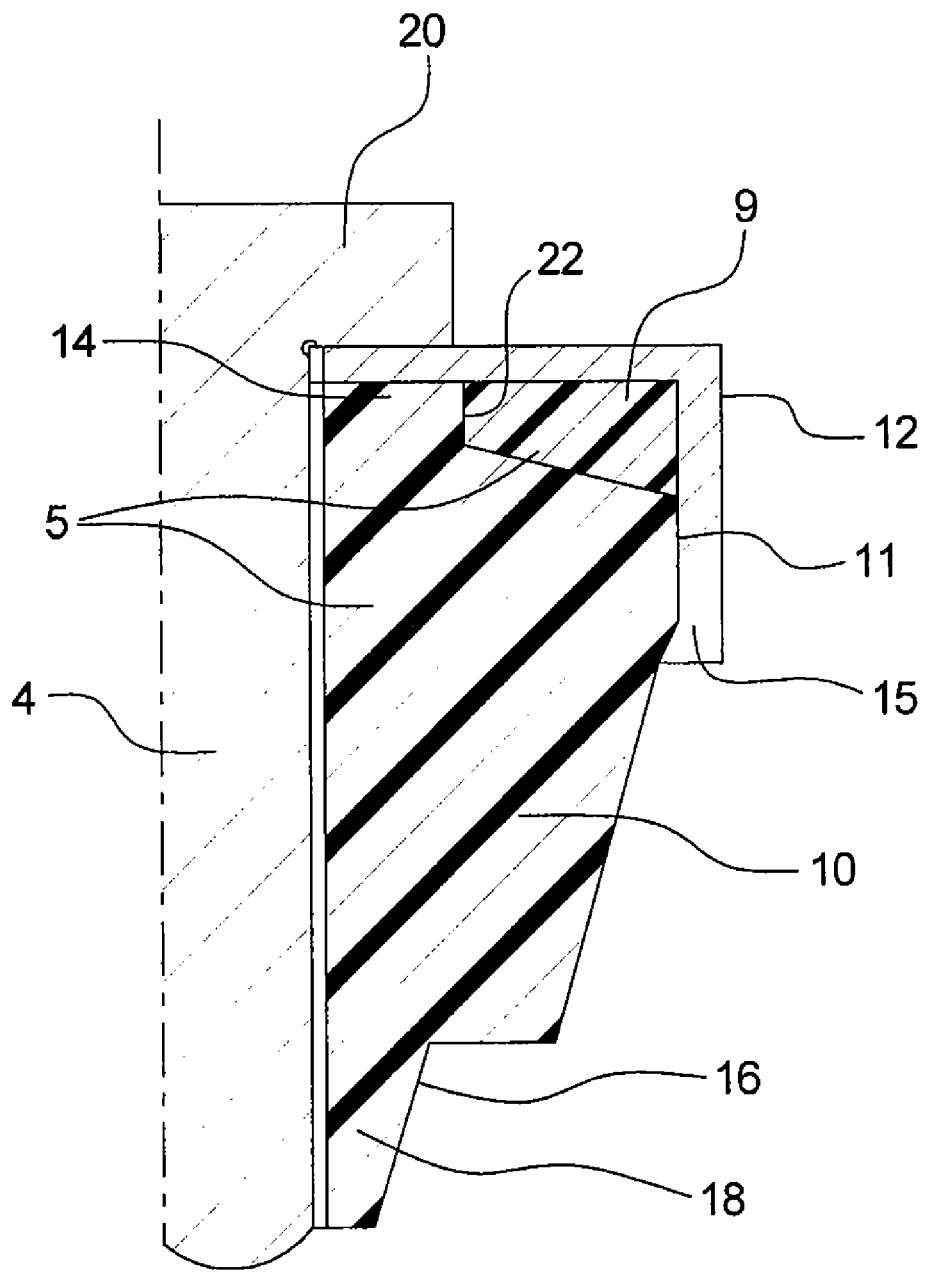
FIG. 3 shows the upper region of the fastening element according to FIG. 2 in an alternative embodiment.

In FIG. 3, an alternative configuration of the invention can be seen insofar as here the support element 5 composed of the components 9 and 10—the same of course can also apply to the other support elements 6, 7, 8—is configured in such a manner that the component 10 has a cylindrical centring surface 22 which ensures that the component 9 is centred. The centring surface 22 also serves here as a radial edge enclosure of the component 9 to the inside—in a similar manner to that of the edge 11 by the components 12 and 13. A conical design of the centring surface 22 is just as possible. Since the component 9 is preferably composed of softer material than the component 10, the component 9 is readily kept in position by the component 10 and the sleeve-shaped component 12 when forces are applied.

The various individual parts are joined together by the proposed configuration in such a manner that preassembled units are produced which make it easier for the user to install the fastening element in the chassis on the assembly belt, since there is a smaller number of parts to be handled than previously. The proposed support elements with guide surfaces together with projections increase the reliability of installing the fastening element on the chassis.

LIST OF REFERENCE NUMBERS

1 Fastening element
2 Part
3 Part
4 Axle
5 Support element
6 Support element
7 Support element
8 Support element
9 Component
10 Component
11 Edge
12 Sleeve-shaped component
13 Sleeve-shaped component
14 Axial bearing surface
15 Undercut
16 Guide surface
17 Guide surface
18 Axial projection
19 Axial projection
20 Head
21 Nut
22 Centring surface

The invention claimed is:

1. A chassis fastening mechanism, comprising:
first and second sleeves each having a circumferential wall defining an enclosure;
a third sleeve disposed between said first and second sleeves and having a circumferential wall defining a pair of opposing enclosures;
first and second support elements each disposed within a respective enclosure of one of said first and third sleeves, a first chassis part being receivable between said first and second support elements thereby being fixedly mountable to the chassis fastening mechanism;
third and fourth support elements each disposed within a respective enclosure of one of said second and third sleeves, a second chassis part being receivable between said third and fourth support elements thereby being fixedly mountable to the chassis fastening mechanism;
a central axle extending through an axially extending through hole of each of said first, second and third sleeves and said first, second, third and fourth support elements, said first and second sleeves being restrained from moving away from each other on said central axle;
wherein each of said first, second, third and fourth support elements comprises first and second damping components disposed axially adjacent each other, an outer surface of each of said first damping components being fully enclosed around an outer edge by said circumferential wall of a respective one of said first, second and third sleeves, said outer edge thereby abutting said circumferential walls of said first, second and third sleeves, and an outer surface of each of said second damping components being partially enclosed around an outer edge by said circumferential wall of a respective one of said first, second and third sleeves, said outer edge of said second damping components thereby abutting said circumferential walls of said first, second and third sleeves, an inner edge of said through hole of said first and second damping components abutting said central axle;
wherein said first and second damping components are made from different materials and said first damping component is softer than said second damping component;
wherein said second damping components of said corresponding first and second support elements and said corresponding third and fourth support elements comprise axial projections with corresponding guide surfaces that non-lockingly enmesh said second damping components when said second damping components axially meet; and
wherein said axial projection of said second damping component of one of said first and second support elements and said axial projection of said second damping component of one of said third and fourth support elements are receivable in respective holes through said first and second chassis parts.

2. The chassis fastening mechanism according to claim 1, wherein said first damping components extend substantially an entire radial width of said second damping components.

3. The chassis fastening mechanism according to claim 2, wherein a cross-sectional shape of said first damping components is rectangular.

4. The chassis fastening mechanism according to claim 2, wherein a cross-sectional shape of said first damping components is wedge-shaped with an axial length of said first damping components increasing radially away from said central axle.

5. The chassis fastening mechanism according to claim 1, wherein a portion of each of said second damping components extends through a respective one of said first damping components and is adjacent a respective one of said first, second and third sleeves, said first damping components being disposed along an outer edge of said portion.

6. The chassis fastening mechanism according to claim 5, wherein a cross-sectional shape of said first damping components is wedge-shaped with an axial length of said first damping components increasing radially away from said central axle.

7. The chassis fastening mechanism according to claim 1, wherein each of said second damping components are in an interference fit with a respective one of said first, second and third sleeves, said first damping components, said second damping components and said respective one of said first, second and third sleeves thereby each being a preassembled unit.

* * * * *

UNITED STATES PATENT AND TRADEMARK OFFICE
CERTIFICATE OF CORRECTION

PATENT NO. : 8,118,515 B2
APPLICATION NO. : 11/684886
DATED : February 21, 2012
INVENTOR(S) : Alexander Goerg It is certified that error appears in the above-identified patent and that said Letters Patent is hereby corrected as shown below:

On the Title Page, Item (30)

Under "Foreign Application Priority Data", replace "10 2007 005 567" with --10 2007 005 567.8--.

Signed and Sealed this
Sixth Day of November, 2012

David J. Kappos
*Director of the United States Patent and Trademark Office*